United States Patent
Hanya et al.

(10) Patent No.: US 7,764,467 B2
(45) Date of Patent: Jul. 27, 2010

(54) SUSPENSION FOR DISC DRIVE

(75) Inventors: Masao Hanya, Yokohama (JP); Eiji Watadani, Yokohama (JP); Kenichi Takikawa, Yokohama (JP)

(73) Assignee: NHK Spring Co., Ltd., Yokohama-shi (JP)

( * ) Notice: Subject to any disclaimer, the term of this patent is extended or adjusted under 35 U.S.C. 154(b) by 749 days.

(21) Appl. No.: 11/787,086

(22) Filed: Apr. 13, 2007

(65) Prior Publication Data
US 2007/0247760 A1   Oct. 25, 2007

(30) Foreign Application Priority Data
Apr. 20, 2006   (JP) .............................. 2006-116837

(51) Int. Cl.
*G11B 5/48*   (2006.01)
(52) U.S. Cl. .................................................. 360/245.7
(58) Field of Classification Search ................. 360/245, 360/245.1, 245.3, 245.7
See application file for complete search history.

(56) References Cited
U.S. PATENT DOCUMENTS

| 6,021,022 | A   | * | 2/2000 | Himes et al.   | 360/245.7 |
| 6,046,883 | A   | * | 4/2000 | Miller         | 360/245.7 |
| 6,388,843 | B1  | * | 5/2002 | Takagi et al.  | 360/245.7 |
| 6,445,546 | B1  | * | 9/2002 | Coon           | 360/245.7 |
| 6,587,309 | B2  | * | 7/2003 | Nojima         | 360/245.7 |
| 7,006,333 | B1  | * | 2/2006 | Summers        | 360/294.4 |
| 7,330,338 | B1  | * | 2/2008 | Wick et al.    | 360/245.7 |

FOREIGN PATENT DOCUMENTS

JP   3443021 B2   6/2003

* cited by examiner

*Primary Examiner*—Angel A. Castro
(74) *Attorney, Agent, or Firm*—Frishauf, Holtz, Goodman & Chick, P.C.

(57) ABSTRACT

A suspension for a disc drive has a load beam, a flexure, a slider, etc. A tongue portion and a pair of outrigger portions are formed on the flexure. Slits are formed between the outrigger portions and opposite side edges of the tongue portion. The tongue portion and the outrigger portions are connected by connecting portions. Limiter members are formed on the load beam. Each limiter member has a bent portion, which is inserted in its corresponding slit, and an extending portion. The extending portion faces its corresponding connecting portion. A trace member is electrically connected to the slider. The trace member passes outside the limiter members and extends along the outrigger portions.

12 Claims, 9 Drawing Sheets

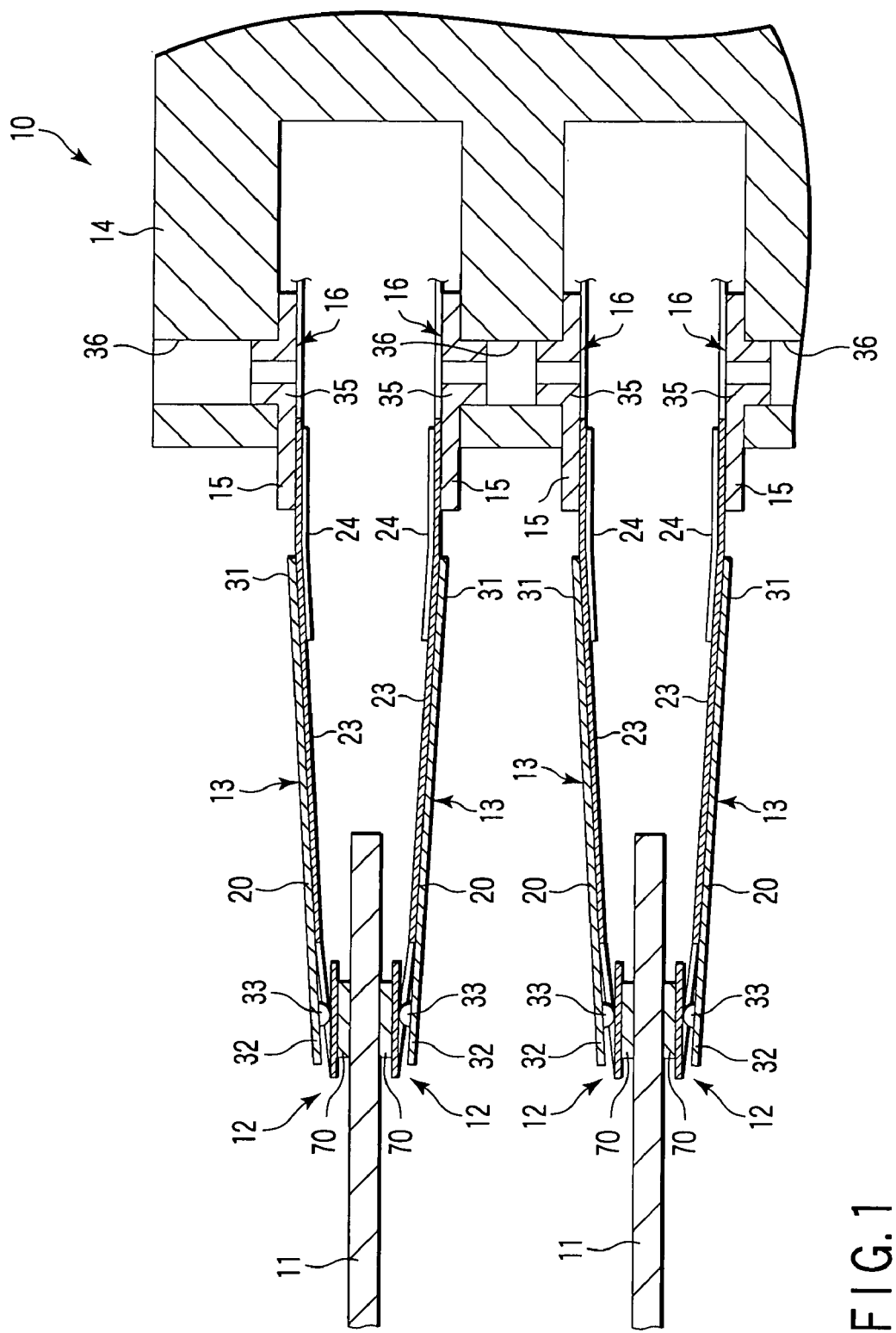
F I G. 1

SUSPENSION FOR DISC DRIVE

CROSS-REFERENCE TO RELATED APPLICATIONS

This application is based upon and claims the benefit of priority from prior Japanese Patent Application No. 2006-116837, filed Apr. 20, 2006, the entire contents of which are incorporated herein by reference.

BACKGROUND OF THE INVENTION

1. Field of the Invention

The present invention relates to a suspension for a disc drive incorporated in an information processor, such as a personal computer.

2. Description of the Related Art

A hard disc drive (HDD) for writing and reading information to and from rotating magnetic discs has a carriage that is turnable about an axis. The carriage is turned about the axis by a positioning motor. As described in Jpn. Pat. No. 3443021 or U.S. Pat. No. 6,046,883, for example, the carriage has an actuator arm and a suspension on the distal end portion of the arm. The suspension is provided with a base plate, a load beam, a flexure, etc. A head including a slider is disposed on the distal end portion of the suspension. The slider is mounted on a tongue portion of the flexure.

FIGS. 12 and 13 typically show a conventional suspension 1. The suspension 1 comprises a load beam 2 and a slider 4. The slider 4 is mounted on a tongue portion 3 (FIG. 13) of a flexure. When a disc 5 rotates at high speed in the direction of arrow R, air flows between the disc 5 and the slider 4, thereby forming an air bearing 6. An air inflow end and an air outflow end of the slider 4 are referred to as the leading side and the trailing side, respectively, in the art. A dimple 7 is formed near the distal end of the load beam 2. The slider 4 is swingable in a pitch direction and a roll direction around the dimple 7.

As shown in FIG. 13, a read/write element 8 is provided on an end portion of the slider 4 on the trailing side. The distance from the trailing-side end portion of the slider 4 to the disc 5 is called a flying height (FH). A load F produced by a spring force that corresponds to deflection of the suspension 1 acts on the flying slider 4 through the dimple 7. At the same time, a leading-side reaction force P1 and a trailing-side reaction force P2 are produced by an air pressure of the air bearing 6. In order to stabilize the flying characteristics of the slider 4, moreover, a contrivance is made to generate a negative pressure P3.

Due to a mounting error of the suspension 1 on an arm (actuator arm), the mounting height (Z-height in FIG. 12) of the suspension 1 changes inevitably.

In connection with the Z-height position of a suspension, in general, the pitch-direction tilt of the slider with the tongue portion in a free state is called a pitch static attitude (PSA). If the Z-height changes, the PSA also changes. If the Z-height increases, the PSA also increases. If the Z-height is reduced, the PSA is also reduced. If the dimple position is in the center of the slider (central position with respect to the longitudinal direction), the product of the PSA and pitch stiffness represents a pitch moment. The pitch moment influences a flying pitch $\beta$ (FIG. 13) and also considerably influences the load and the flying height. According to a modern air bearing design of the slider, in particular, flying height sensitivity to the PSA is made higher than to the load, in order to reduce the influence on the flying height of the height above sea level (atmospheric concentration). The shorter an effective length L of the load beam, the more remarkable this influence is.

This is because a load beam 2' with a shorter effective length L, as compared with the load beam 2 with a longer effective length L, is configured so that an angle $\alpha$ of the load beam changes more sharply as the Z-height changes, as shown in FIG. 12. In the load beam 2' with the shorter effective length L, therefore, the sensitivity of the PSA to the Z-height is further enhanced, so that it is more difficult to lower the flying height.

According to an investigation conducted by the inventors hereof, the sensitivity of the flying pitch to the Z-height is proportional to the pitch moment that acts on the slider. The higher the stiffness of the flexure, moreover, the higher the sensitivity of the flying pitch $\beta$ is. In other words, the lower the stiffness of the tongue portion in the pitch direction, the lower the PSA sensitivity around the center of gravity of the slider. In view of the sensitivity of the flying pitch $\beta$, therefore, the pitch stiffness of the flexure should preferably be lower.

If the pitch stiffness of the flexure is low, however, the flexure is easily deformed by some external force that acts thereon in its bending direction as the suspension is fixed to the arm (actuator arm) or handled for some purpose.

FIGS. 14 and 15 show prior art suspensions 100 and 101, respectively. In each of the suspensions 100 and 101, limiter members 111 on the distal end portion of a load beam 110 restrain a tongue portion 112 and the like from being displaced for a predetermined amount or more. In the suspension 100 shown in FIG. 14, for example, the limiter members 111 are opposed individually to receiving portions 114 of outrigger portions 113. The limiter members 111 restrain a flexure 115 from being deformed. The limiter members 111 of the suspension 101 shown in FIG. 15 are opposed individually to receiving portions 116 on the opposite sides of the tongue portion 112. The limiter members 111 restrain the flexure 115 from being deformed.

The suspensions 100 and 101 are each provided with trace members 120 that have conductors through which write or read current flows. The trace members 120 are electrically connected to terminals of a slider 121. In order to avoid interference with its corresponding limiter member 111, each trace member 120 is located between the tongue portion 112 and the corresponding outrigger portion 113 along the vicinity of each side portion of the slider 121. The flexure having the trace members 120 of this type is called an inner trace flexure.

The trace members 120 of each of the suspensions 100 and 101 are located between the tongue portion 112 and their corresponding outrigger portions 113. An intensive investigation conducted by the inventors hereof indicates that regions near the terminals of the slider 121 are heated when current (especially, high write current) is supplied to the trace members 120 and the resulting heat may possibly change the PSA and the flying height.

BRIEF SUMMARY OF THE INVENTION

The object of the present invention is to provide a suspension for disc drive, in which a flexure can be prevented from being displaced for a predetermined amount or more, and PSA changes attributable to heating of a slider or the like can be reduced further to stabilize the flying height.

A suspension according to the invention comprises: a load beam having a proximal portion and a distal end portion; a flexure which is located overlapping the load beam, extends in a longitudinal direction of the load beam, and has a first surface opposed to the load beam and a second surface on the side opposite from the load beam; a tongue portion formed on the flexure and bendable in the thickness direction thereof; a dimple formed on the distal end portion of the load beam so as to project toward the tongue portion; a pair of outrigger portions formed on the flexure so as to extend individually along opposite side edges of the tongue portion; slits formed between the outrigger portions and the opposite side edges of the tongue portion; connecting portions which connect the outrigger portions with that part of the tongue portion which is situated near a distal end portion of the flexure; a slider mounted on the tongue portion; limiter members which are formed on the load beam and each have a bent portion, which projects from the first surface of the flexure toward the second surface through the slit corresponding thereto, and an extending portion, which extends along the second surface from the bent portion toward the connecting portion corresponding thereto, the extending portion being opposed to the connecting portion in the thickness direction of the flexure; and a trace member which is electrically connected to the slider, passes through regions outside the limiter members, and extends along the outrigger portions toward the proximal portion of the load beam.

According to this arrangement, the limiter members can prevent the flexure from being deformed in a pitch direction and the like. Since the trace member passes outside the outrigger portions, moreover, PSA changes attributable to heating of the slider can be reduced, so that the flying height can be further stabilized. Since the limiter members are located near the center of gravity of the slider, the limiter members can effectively prevent the flexure from being deformed too much near the dimple despite their compactness.

In a preferred mode of the invention, those parts of the trace member which extend along the outrigger portions are located outside the outrigger portions with gaps therebetween. According to this arrangement, the PSA changes attributable to heating of the slider can be further reduced.

By way of example, the limiter members are formed by bending projections on opposite side edges of the distal end portion of the load beam in the thickness direction of the load beam.

In one mode of the invention, a pair of rail portions are formed by bending the opposite side edges of the load beam in the thickness direction of the load beam, a loading/unloading tab is formed protruding from the distal end portion of the load beam, and the limiter members are formed by bending projections on longitudinal parts of the rail portions.

In another mode of the invention, a pair of rail portions are formed by bending the opposite side edges of the load beam in the thickness direction of the load beam, a width between the pair of rail portions at the distal end portion of the load beam is greater than the width of the distal end portion of the flexure, a loading/unloading tab is formed protruding from the distal end portion of the load beam, and the limiter members are formed by cutting and raising parts of the load beam between the rail portions in the thickness direction of the load beam.

In each of these modes, the tongue portion has a leading-side end portion, and a leading-side limiter member for restraining the tongue portion from being displaced for a predetermined amount or more in the thickness direction may be provided on the leading-side end portion.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a partial sectional view of a disc drive provided with a suspension according to a first embodiment of the invention;

DETAILED DESCRIPTION OF THE INVENTION

A first embodiment of the present invention will now be described with reference to FIGS. 1 to 5.

A hard disc drive (HDD) 10 shown in FIG. 1 comprises a plurality of discs 11 for use as recording media, a plurality of suspensions 13 for disc drive individually having heads 12, and an arm (actuator arm) 14 on which the suspensions 13 are mounted. The heads 12 serve to magnetically write and read information to and from the respective recording surfaces of the discs 11. The arm 14 is turned about an axis (not shown) by a positioning motor (not shown).

Figure 2:
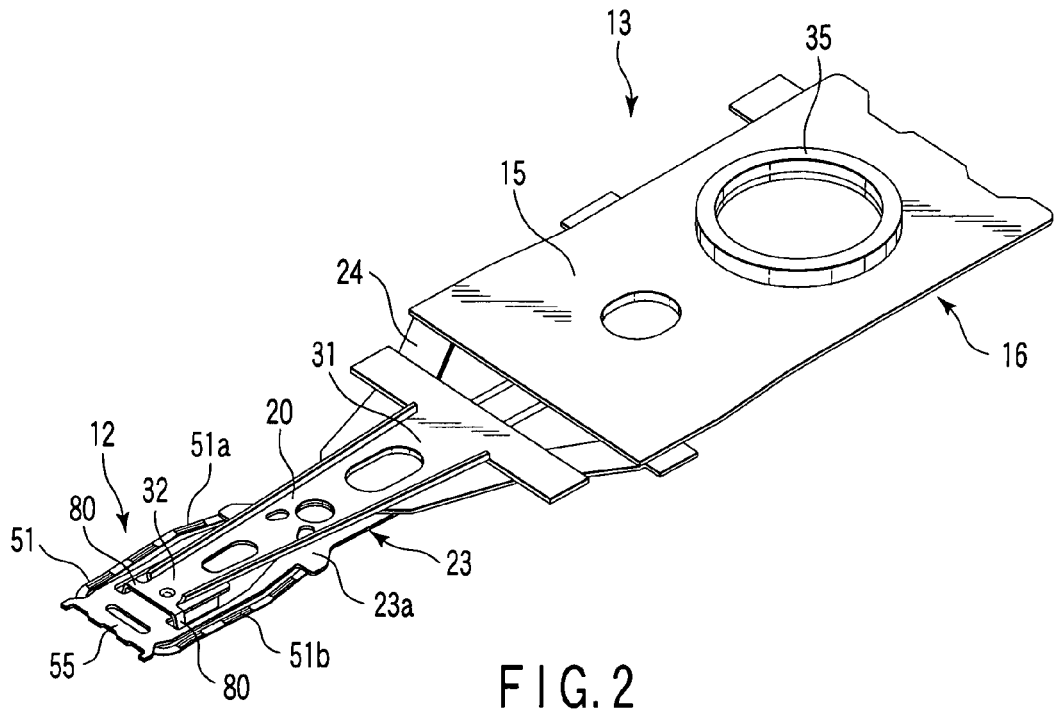
FIG. 2 is a perspective view of the suspension used for the disc drive shown in FIG. 1.
Figure 3:
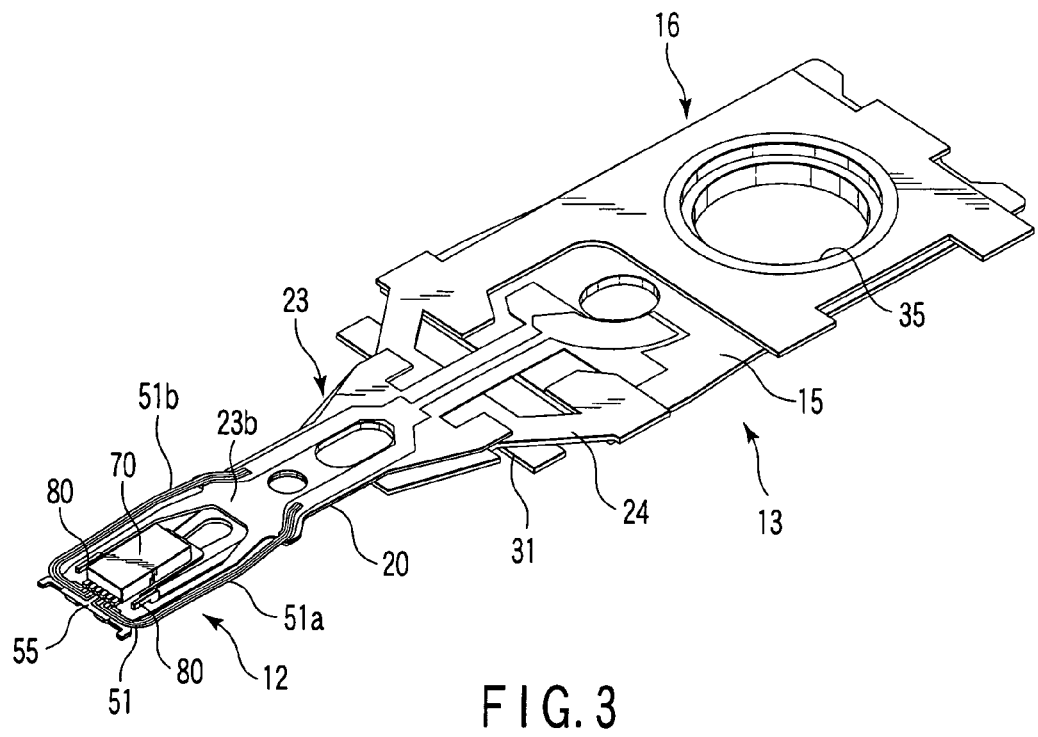
FIG. 3 is a perspective view of the suspension shown in FIG. 2, taken from the reverse side.
Figure 4:
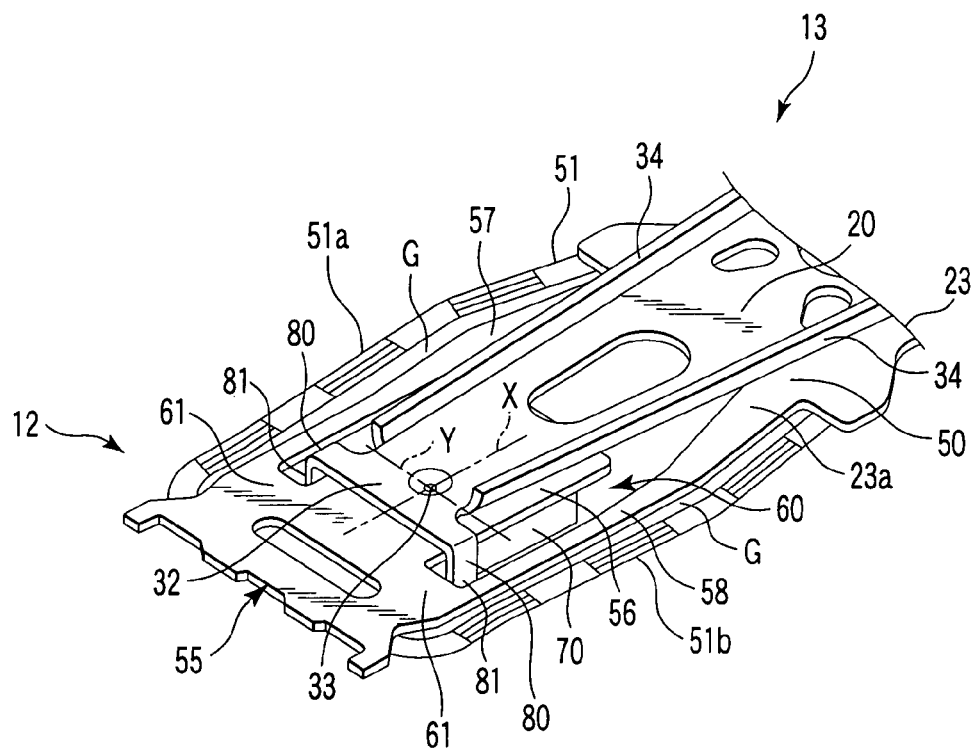
FIG. 4 is a perspective view enlargedly showing a head of the suspension shown in FIG. 2.
Figure 5:
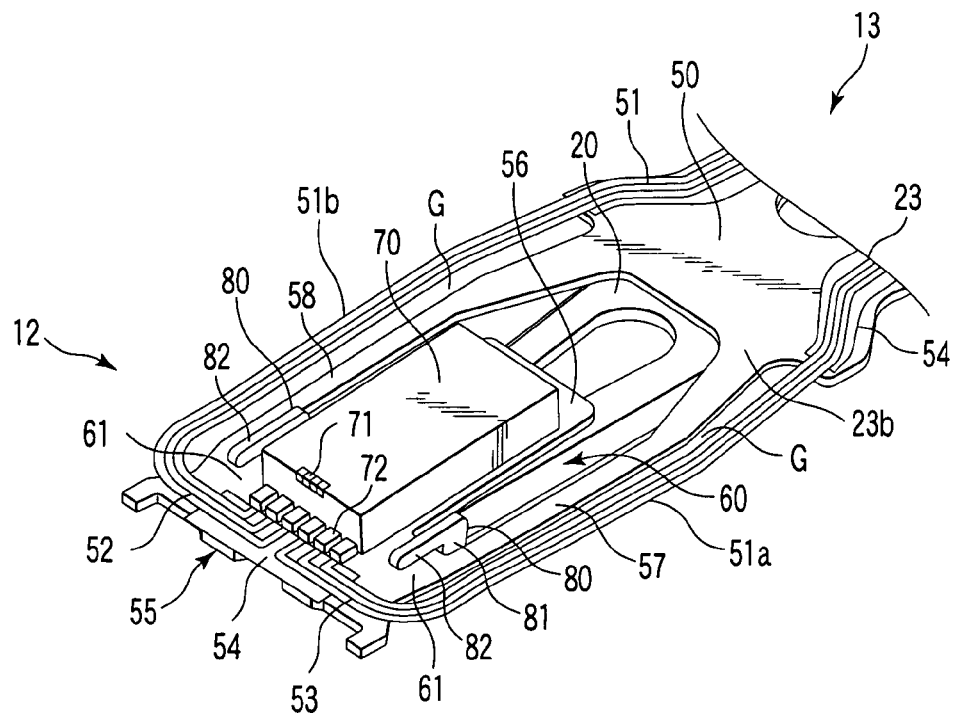
FIG. 5 is a perspective view of the head shown in FIG. 4, taken from the reverse side.

FIG. 2 is a perspective view of one of the suspensions 13 taken from the obverse side. FIG. 3 is a perspective view of the suspension 13 taken from the reverse side. FIG. 4 is an enlarged view of the head 12 of the suspension 13 shown in FIG. 2. FIG. 5 is a perspective view of the head 12 taken from the reverse side.

As shown in FIGS. 2 and 3, each suspension 13 comprises a base portion 16 provided with a base plate 15, a load beam 20, a flexure 23 attached to the load beam 20, and a hinge member 24. The flexure 23 is disposed along the load beam 20 and fixed overlapping the load beam 20. The flexure 23 extends in the longitudinal direction of the load beam 20.

The load beam 20 has a proximal portion 31 and a distal end portion 32. A dimple 33 (FIG. 4) is formed near the distal end portion 32. The dimple 33 projects toward the flexure 23. The thickness of the load beam 20 ranges from about 25 to 100 μm, for example. In general, the thickness of the base plate 15 is greater than that of the load beam 20 and ranges from about 150 to 200 μm, for example. A pair of rail portions 34 (FIG. 4) are formed individually on the opposite side portions of the load beam 20 by bending the opposite side edges of the load beam in the thickness direction thereof.

The base plate 15 is formed with a cylindrical boss portion 35 (FIG. 2). As shown in FIG. 1, each base plate 15 is fixed to the arm 14 by inserting the boss portion 35 into a mounting hole 36 in the arm 14 and crimping (plastically deforming) the boss portion 35 from inside.

The thickness of the hinge member 24 is smaller than that of the load beam 20 and ranges from about 25 to 40 μm, for example. The hinge member 24 has spring characteristics and can elastically bend in its thickness direction. The front part of the hinge member 24 is fixed to the proximal portion 31 of the load beam 20. The rear part of the hinge member 24 is fixed to the base plate 15. Thus, the load beam 20 can elastically bend in the thickness direction around the hinge member 24 with respect to the base plate 15.

The flexure 23 is lapped on the obverse or reverse surface of the load beam 20 on the same side as the hinge member 24. Specifically, the flexure 23 has a first surface 23a that faces the load beam 20 and a second surface 23b on the side opposite from the load beam 20. The flexure 23 has a metal base 50, which is made of a stainless steel plate with spring characteristics, and a trace member 51 formed on the metal base 50. The metal base 50 is generally thinner than the hinge member 24, and its thickness ranges from about 15 to 25 μm, for example. The trace member 51 includes an electrically conductive path 52 for writing and an electrically conductive path 53 for reading (partially shown in FIG. 5), which are formed of a conductor each, and an electrically insulating layer 54 formed of polyimide or the like.

A tongue portion 56 and a pair of outrigger portions 57 and 58 are formed near a distal end portion 55 of the flexure 23. The tongue portion 56 functions as a movable part that has spring characteristics. The tongue portion 56 can bend in the thickness direction of the flexure 23 with respect to the load beam 20. The outrigger portions 57 and 58 are formed individually along the opposite side edges of the tongue portion 56. Slits 60 are formed individually between the opposite side edges of the tongue portion 56 and the outrigger portions 57 and 58. Connecting portions 61 are formed on the distal end portion 55 of the flexure 23. They connect the outrigger portions 57 and 58 with that part of the tongue portion 56 which is situated near the distal end portion 55. The tongue portion 56, outrigger portions 57 and 58, and connecting portions 61 are parts of the metal base 50 of the flexure 23.

The top of the dimple 33 abuts the tongue portion 56. The tongue portion 56 is swingable in a pitch direction, a roll direction, etc., around the dimple 33. The roll direction is a direction around an axis X shown in FIG. 4. The pitch direction is a direction around an axis Y that is perpendicular to the axis X.

A slider 70 that constitutes the head 12 is mounted on the tongue portion 56. The longitudinal direction of the slider 70 extends along the axis X. The slider 70 is fixed with an adhesive to that surface of the tongue portion 56 that faces one of the discs 11. The slider 70 is provided with a read/write element 71 such as a magnetoelectric transducer. When the disc 11 rotates, air flows from an air inflow end on the leading side toward an air outflow end on the trailing side. This air flow forms an air bearing between the disc 11 and the slider 70. The element 71 is provided on the trailing-side end portion of the slider 70.

As shown in FIG. 5, the electrically conductive paths 52 and 53 of the trace member 51 for writing and reading are electrically connected to a terminal area 72 of the slider 70. The trace member 51 has portions 51a and 51b that extend along the outrigger portions 57 and 58, respectively. These portions 51a and 51b bifurcate from the terminal area 72 with the slider 70 between them. The portions 51a and 51b pass individually through regions outside the slits 60 and the outrigger portions 57 and 58 and extend along their corresponding outrigger portions 57 and 58 toward the proximal portion 31 of the load beam 20. The portions 51a and 51b that extend along the outrigger portions 57 and 58 are located outside and apart from the outrigger portions. Thus, gaps G are defined individually between the portions 51a and 51b and the outrigger portions 57 and 58.

As shown in FIGS. 4 and 5, a pair of limiter members 80 are provided on the distal end portion 32 of the load beam 20. Each of the limiter members 80 has a bent portion 81, which is inserted in its corresponding slit 60, and an extending portion 82. The bent portion 81 projects from the first surface 23a of the flexure 23 toward the second surface 23b of the flexure through the slit 60. The extending portion 82 extends along the second surface 23b from the bent portion 81 toward its corresponding connecting portion 61. The extending portion 82 is opposed to the connecting portion 61 with a space in the thickness direction of the flexure 23.

The limiter members 80 of the present embodiment are formed by bending L-shaped projections on the opposite side edges of the distal end portion 32 of the load beam 20 in the thickness direction of the load beam. The extending portion 82 of each limiter member 80 is opposed to the connecting portion 61 with a space therebetween so that it can engage the connecting portion in the thickness direction of the flexure 23. Accordingly, if the tongue portion 56 and the outrigger portions 57 and 58 are urged to be displaced for a predetermined amount or more in the pitch or roll direction as the suspension 13 is handled, for example, the respective extending portions 82 of the limiter members 80 abut the connecting portions 61. Thus, the limiter members 80 can restrain the tongue portion 56 and the outrigger portions 57 and 58 from being deformed for the predetermined amount or more. Besides, the limiter members 80 are located near the dimple 33, that is, near the center of gravity of the mass of the slider 70. Accordingly, displacements of the tongue portion 56 in the pitch and roll directions can be suppressed effectively.

In the present embodiment, as described above, the limiter members 80 are inserted individually in the slits 60 that are formed between the tongue portion 56 and the outrigger portions 57 and 58. The limiter members 80 can engage the connecting portions 61, individually. Accordingly, the trace member 51 can be located outside the slits 60. Thus, the flexure 23 according to the present embodiment is an outer trace flexure. Since the trace member 51 of this outer trace flexure 23 detours around the outside of the outrigger portions 57 and 58, it can avoid interfering with the limiter members 80.

Figure 6:
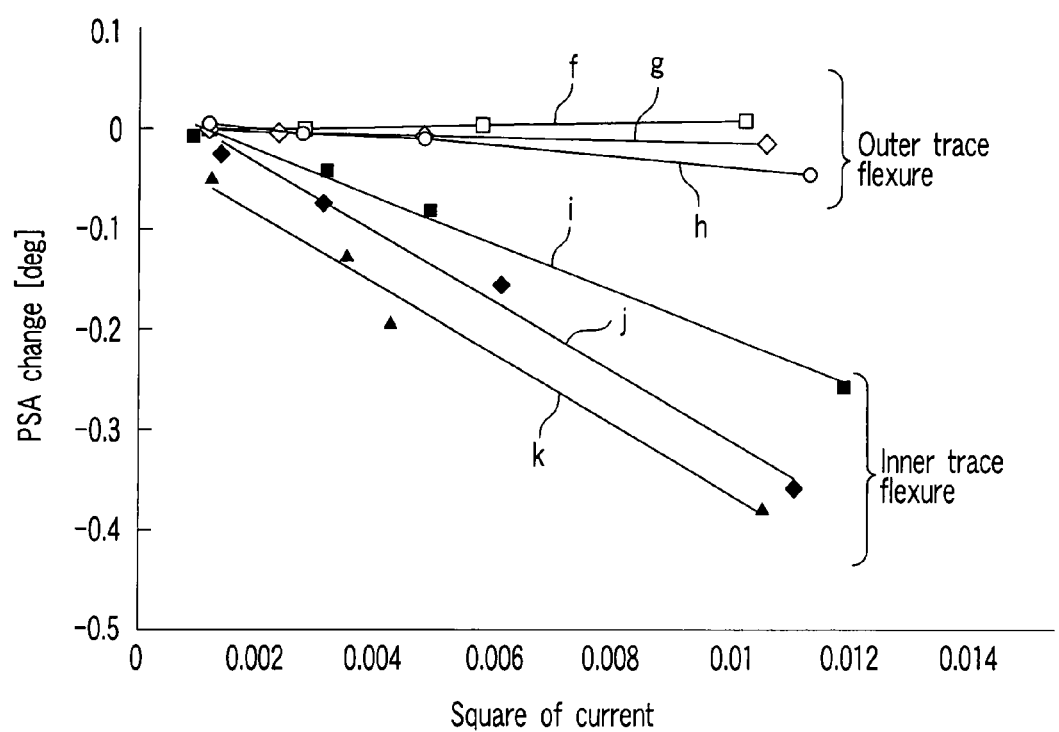
FIG. 6 is a diagram showing PSA changes observed when outer and inner trace flexures are energized.

Segments f, g and h in FIG. 6 individually represent PSA changes observed when the respective trace members of three types of outer trace flexures according to the present embodiment are energized. Segments i, j and k in FIG. 6 individually represent PSA changes observed when the respective trace members of three types of conventional inner trace flexures are energized. The abscissa of FIG. 6 represents the square of the current, which is a watt-equivalent associated with heat quantity. As seen from FIG. 6, the PSA changes of the outer trace flexures (segments f, g and h in FIG. 6) according to the present embodiment can be made much smaller than those of the inner trace flexures (segments i, j and k in FIG. 6).

According to the present embodiment, therefore, the PSA changes can be reduced even if the slider 70 is heated by supplying current to the trace member 51 during data writing or reading operation. Thus, dispersion of the flying height can be lessened, so that the flying height can be reduced. If the flying height is reduced, more information can be recorded on the recording surface of the disc 11, so that the integration density can be increased.

Figure 7:
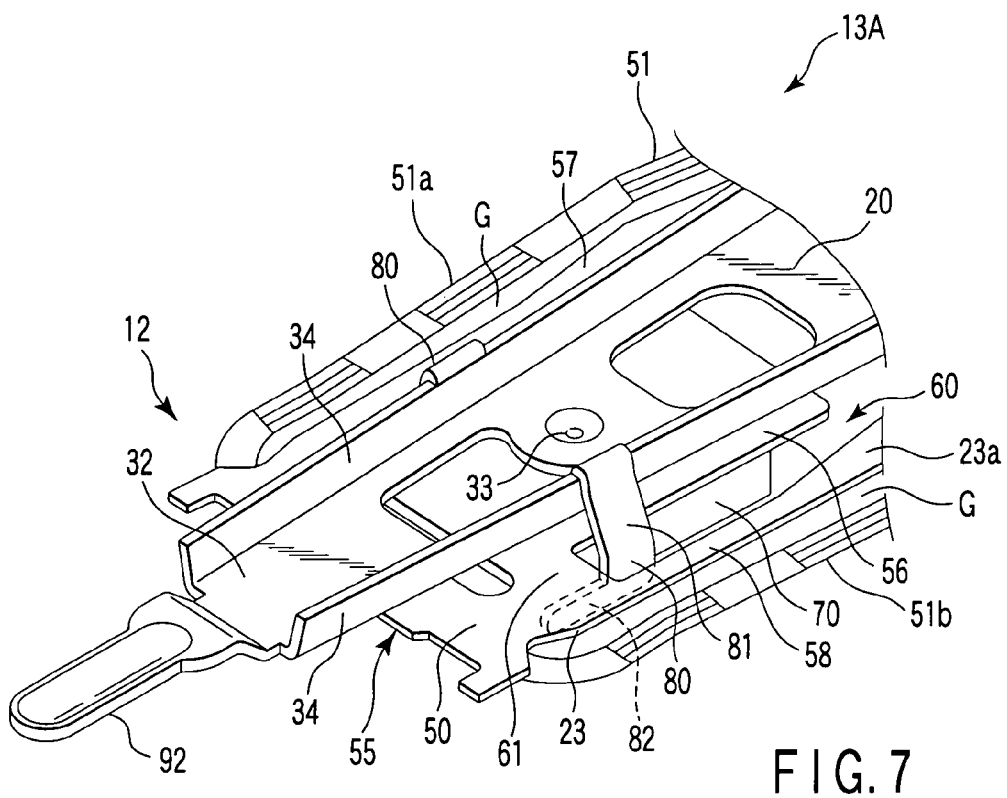
FIG. 7 is a perspective view of a head of a suspension according to a second embodiment of the invention.
Figure 8:
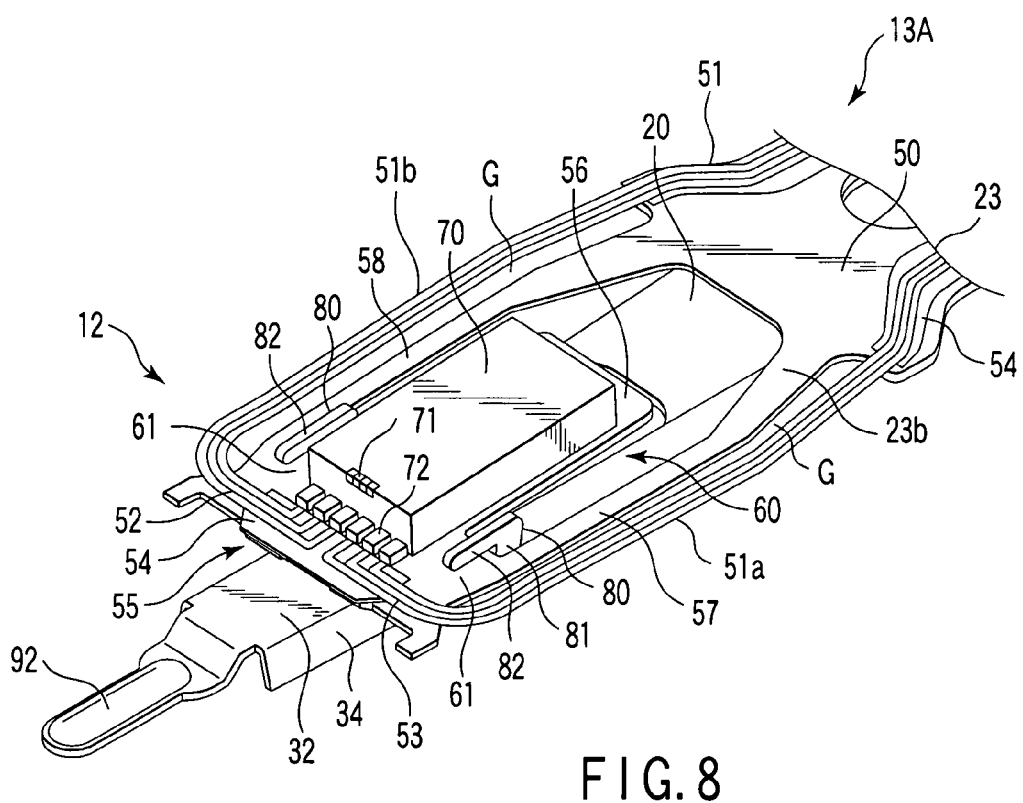
FIG. 8 is a perspective view of the head shown in FIG. 7, taken from the reverse side.

FIGS. 7 and 8 show a suspension 13A according to a second embodiment of the invention. The suspension 13A also has rail portions 34 on the opposite side edges of a load beam 20. The rail portions 34 extend to a distal end portion 32 of the load beam 20. A limiter member 80 is provided in the longitudinal middle of each rail portion 34. The limiter members 80 are formed by individually doubling L-shaped projections on the rail portions 34.

Each of the paired limiter members 80 has a bent portion 81, which is inserted in a slit 60, and an extending portion 82. The bent portion 81 projects from a first surface 23a of a flexure 23 toward a second surface 23b of the flexure 23 through the slit 60. The extending portion 82 extends along the second surface 23b from the bent portion 81 toward a connecting portion 61. The extending portion 82 is opposed to the connecting portion 61 in the thickness direction of the flexure 23.

As shown in FIGS. 7 and 8, a loading/unloading tab 92 protrudes from the distal end portion 32 of the load beam 20. When a disc drive is not operating, the tab 92 lies on a ramp (support member) that is set beside a disc. When the disc drive is worked, the tab 92 leaves the ramp and moves toward the disc. Since the suspension 13A shares other configurations and functions with the suspension 13 of the first embodiment, common numerals are used to designate those portions which are common to the two suspensions, and a description thereof is omitted.

In the suspension 13A of the second embodiment, the limiter member 80 is provided in the longitudinal middle of each rail portion 34. Therefore, the rail portions 34 can be extended close to the tab 92 of the distal end portion 32 of the load beam 20. Thus, the bending stiffness of the load beam 20 can be increased, so that the extent to which the load beam 20 is bent when the tab 92 is grounded on the ramp can be lowered. Besides, the limiter members 80 are located near a dimple 33, that is, near the center of gravity of the mass of a slider 70. Accordingly, displacements of a tongue portion 56 in the pitch and roll directions can be suppressed effectively.

Figure 9:
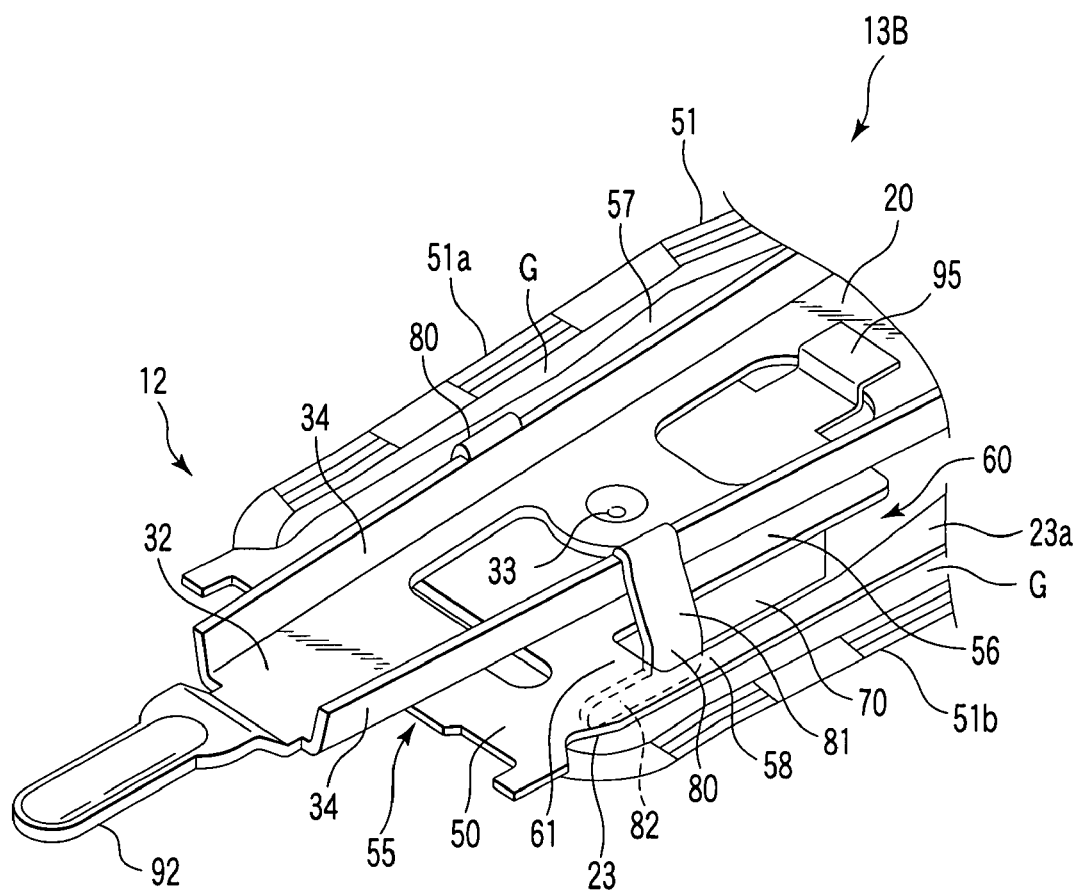
FIG. 9 is a perspective view of a head of a suspension according to a third embodiment of the invention.

FIG. 9 shows a suspension 13B according to a third embodiment of the invention. The suspension 13B comprises the aforementioned limiter members 80 and a limiter member 95 formed on the leading side of a tongue portion 56. The limiter members 80 and 95 can further effectively restrain the tongue portion 56 from being displaced for a predetermined amount or more. The suspension 13B shares other configurations and functions with the suspension 13A of the second embodiment.

Figure 10:
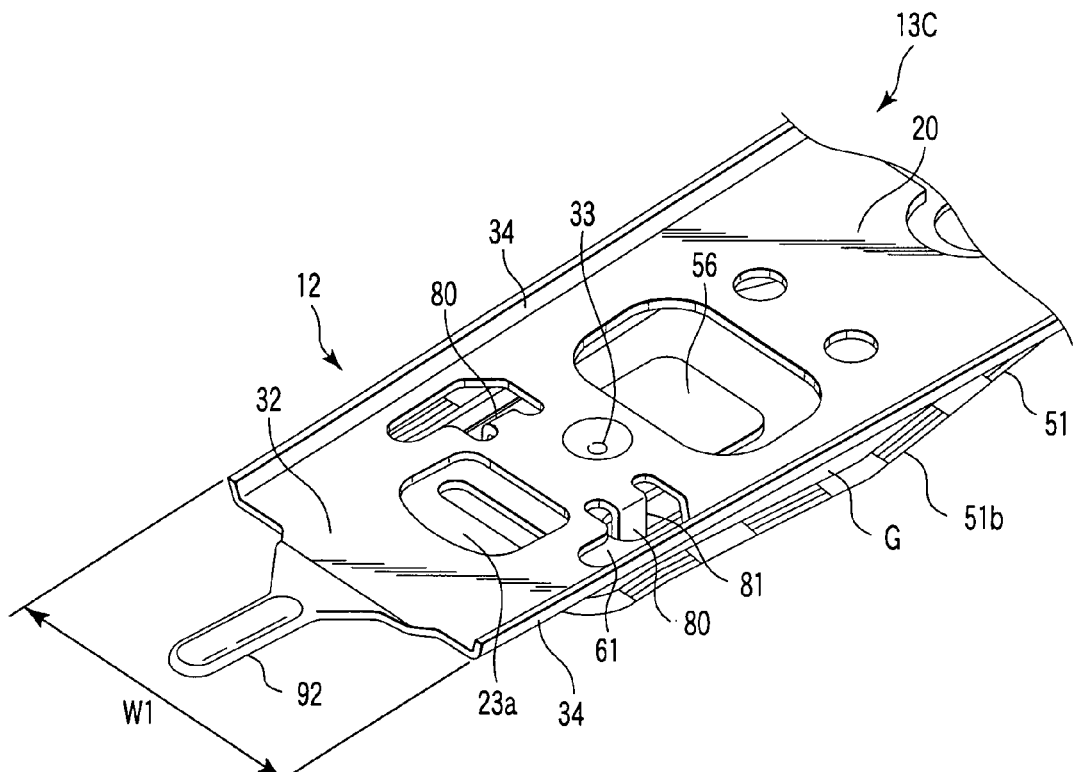
FIG. 10 is a perspective view of a head of a suspension according to a fourth embodiment of the invention.
Figure 11:
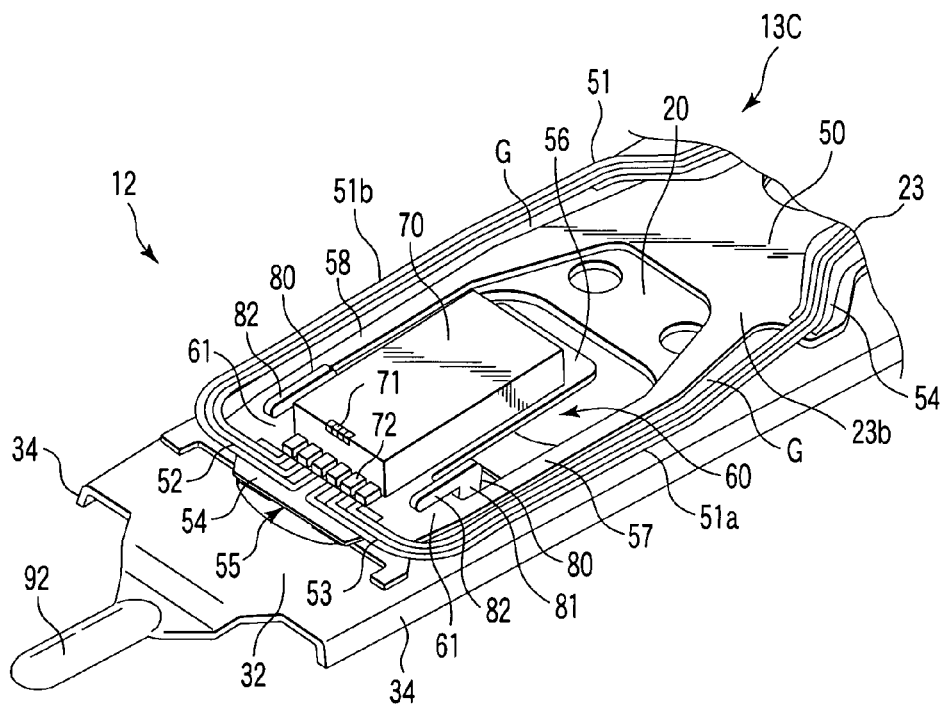
FIG. 11 is a perspective view of the head shown in FIG. 10, taken from the reverse side.
Figure 12:
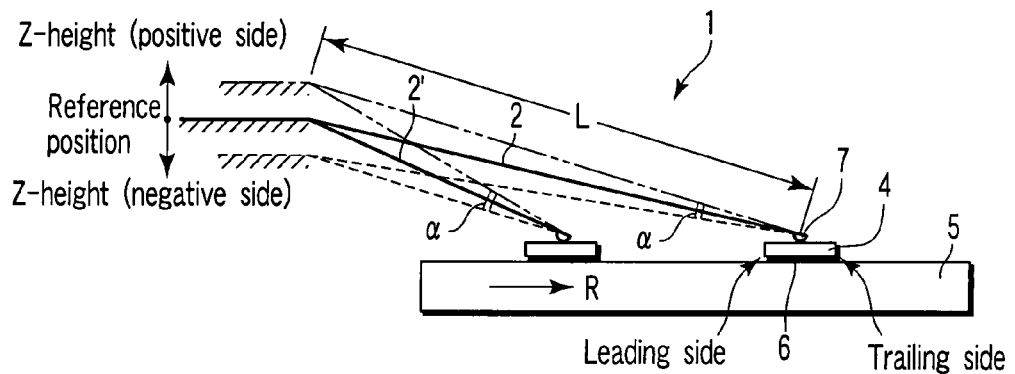
FIG. 12 is a side view schematically showing a conventional suspension.
Figure 13:
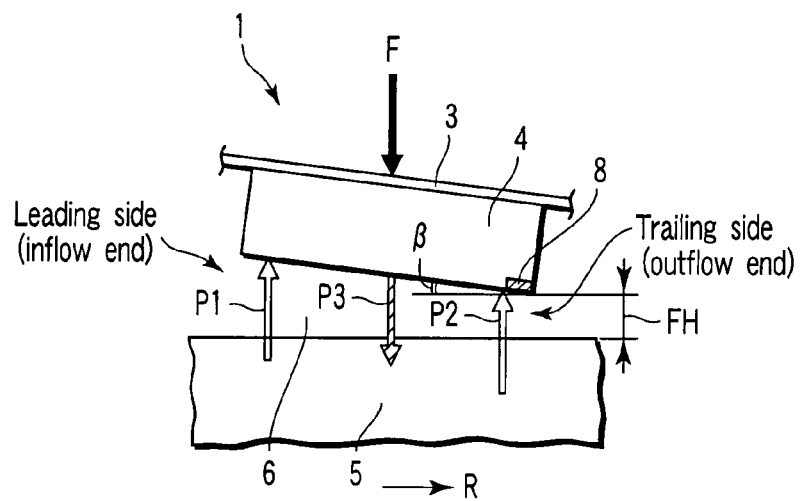
FIG. 13 is a view typically illustrating a load, reaction forces, etc., acting on a slider of the suspension shown in FIG. 12.
Figure 14:
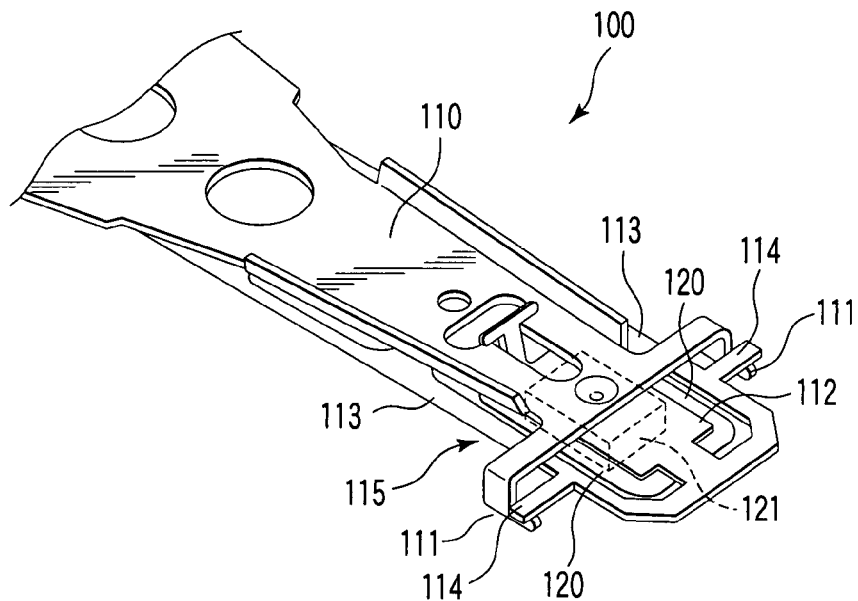
FIG. 14 is a perspective view of a head of a prior art suspension.
Figure 15:
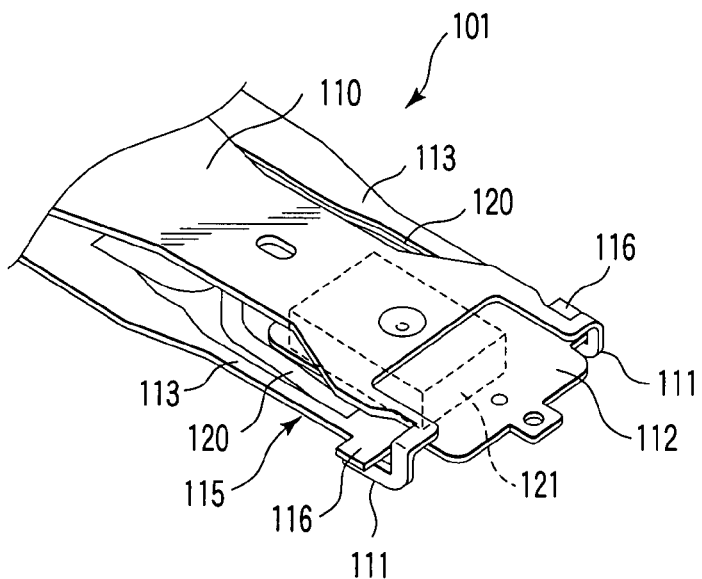
FIG. 15 a perspective view of a head of another prior art suspension.

FIGS. 10 and 11 show a suspension 13C according to a fourth embodiment of the invention. The suspension 13C also has rail portions 34 on the opposite side edges of a load beam 20. A width W1 (FIG. 10) between the paired rail portions 34 at a distal end portion 32 of the load beam 20 is greater than the width of a distal end portion 55 of a flexure 23. A loading/unloading tab 92 protrudes from the distal end portion 32 of the load beam 20. Further, the suspension 13C has a pair of limiter members 80. The limiter members 80 are individually formed by cutting and raising parts of the load beam 20 between pair of the rail portions 34 in the thickness direction. Since the suspension 13C shares other configurations and functions with the suspension 13A of the second embodiment, common numerals are used to designate those portions which are common to the two suspensions, and a description thereof is omitted.

Each of the limiter members 80 of the suspension 13C also has a bent portion 81, which is inserted in a slit 60, and an extending portion 82. The bent portion 81 projects from a first surface 23a of a flexure 23 toward a second surface 23b of the flexure 23 through the slit 60. The extending portion 82 extends along the second surface 23b from the bent portion 81 toward a connecting portion 61. The extending portion 82 is opposed to the connecting portion 61 in the thickness direction of the flexure 23.

Also in the suspension 13C, the rail portions 34 can be extended close to the tab 92 of the distal end portion 32 of the load beam 20. Thus, the bending stiffness of the load beam 20 can be increased, so that the extent to which the load beam 20 is bent when the tab 92 is grounded on a ramp can be lowered. Besides, the limiter members 80 are located near a dimple 33, that is, near the center of gravity of the mass of a slider 70. Accordingly, displacements of a tongue portion 56 in the pitch and roll directions can be suppressed effectively.

In each of the embodiments described above, the portions 51a and 51b that extend along the outrigger portions 57 and 58 of the trace member 51 may be arranged overlapping the outrigger portions 57 and 58, respectively. Further, parts of the trace member 51 may alternatively be formed passing through regions (corresponding to the slits 60) inside the outrigger portions 57 and 58.

It is to be understood, in carrying out the present invention including the embodiments described herein, that the components of the suspension, such as the load beam, flexure, trace member, limiter members, etc., may be variously modified without departing from the scope or spirit of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A suspension for a disc drive, comprising:
a load beam having a proximal portion and a distal end portion;
a flexure which is located overlapping the load beam, extends in a longitudinal direction of the load beam, and has a first surface opposed to the load beam and a second surface on the side opposite from the load beam;
a tongue portion formed on the flexure and bendable in the thickness direction thereof;
a dimple formed on the distal end portion of the load beam so as to project toward the tongue portion;
a pair of outrigger portions formed on the flexure so as to extend individually along opposite side edges of the tongue portion;
slits formed between the outrigger portions and the opposite side edges of the tongue portion;

connecting portions which connect the outrigger portions with that part of the tongue portion which is situated near a distal end portion of the flexure;

a slider mounted on the tongue portion;

limiter members which are formed on the load beam and each have a bent portion, which projects from the first surface of the flexure toward the second surface through the slit corresponding thereto, and an extending portion, which extends along the second surface from the bent portion toward the connecting portion corresponding thereto, the extending portion being opposed to the connecting portion in the thickness direction of the flexure; and a trace member which is electrically connected to the slider, passes through regions outside the limiter members, and extends along the outrigger portions toward the proximal portion of the load beam.

2. A suspension for a disc drive according to claim 1, wherein those parts of the trace member which extend along the outrigger portions are located outside the outrigger portions with gaps therebetween.

3. A suspension for a disc drive according to claim 2, wherein the limiter members are formed by bending projections on opposite side edges of the distal end portion of the load beam in the thickness direction of the load beam.

4. A suspension for a disc drive according to claim 3, wherein the tongue portion has a leading-side end portion, and a leading-side limiter member for restraining the tongue portion from being displaced for a predetermined amount or more in the thickness direction is provided on the leading-side end portion.

5. A suspension for a disc drive according to claim 2, wherein a pair of rail portions are formed by bending the opposite side edges of the load beam in the thickness direction of the load beam, a loading/unloading tab is formed protruding from the distal end portion of the load beam, and the limiter members are formed by bending projections on longitudinal parts of the rail portions.

6. A suspension for a disc drive according to claim 5, wherein the tongue portion has a leading-side end portion, and a leading-side limiter member for restraining the tongue portion from being displaced for a predetermined amount or more in the thickness direction is provided on the leading-side end portion.

7. A suspension for a disc drive according to claim 2, wherein a pair of rail portions are formed by bending the opposite side edges of the load beam in the thickness direction of the load beam, a width between the pair of rail portions at the distal end portion of the load beam is greater than the width of the distal end portion of the flexure, a loading/unloading tab is formed protruding from the distal end portion of the load beam, and the limiter members are formed by cutting and raising parts of the load beam between the rail portions in the thickness direction of the load beam.

8. A suspension for a disc drive according to claim 1, wherein the limiter members are formed by bending projections on opposite side edges of the distal end portion of the load beam in the thickness direction of the load beam.

9. A suspension for a disc drive according to claim 8, wherein the tongue portion has a leading-side end portion, and a leading-side limiter member for restraining the tongue portion from being displaced for a predetermined amount or more in the thickness direction is provided on the leading-side end portion.

10. A suspension for a disc drive according to claim 1, wherein a pair of rail portions are formed by bending the opposite side edges of the load beam in the thickness direction of the load beam, a loading/unloading tab is formed protruding from the distal end portion of the load beam, and the limiter members are formed by bending projections on longitudinal parts of the rail portions.

11. A suspension for a disc drive according to claim 10, wherein the tongue portion has a leading-side end portion, and a leading-side limiter member for restraining the tongue portion from being displaced for a predetermined amount or more in the thickness direction is provided on the leading-side end portion.

12. A suspension for a disc drive according to claim 1, wherein a pair of rail portions are formed by bending the opposite side edges of the load beam in the thickness direction of the load beam, a width between the pair of rail portions at the distal end portion of the load beam is greater than the width of the distal end portion of the flexure, a loading/unloading tab is formed protruding from the distal end portion of the load beam, and the limiter members are formed by cutting and raising parts of the load beam between the rail portions in the thickness direction of the load beam.

* * * * *